(12) United States Patent
Padowicz

(10) Patent No.: US 9,383,207 B2
(45) Date of Patent: Jul. 5, 2016

(54) SELF-CONTAINED NAVIGATION SYSTEM AND METHOD

(71) Applicant: Ronen Padowicz, Tel-Aviv (IL)

(72) Inventor: Ronen Padowicz, Tel-Aviv (IL)

( * ) Notice: Subject to any disclaimer, the term of this patent is extended or adjusted under 35 U.S.C. 154(b) by 113 days.

(21) Appl. No.: 14/289,681

(22) Filed: May 29, 2014

(65) Prior Publication Data

US 2014/0358433 A1 Dec. 4, 2014

(30) Foreign Application Priority Data

Jun. 4, 2013 (IL) .......................................... 226752

(51) Int. Cl.
*G01C 21/04* (2006.01)
*G01S 5/16* (2006.01)
*G01S 5/02* (2010.01)

(52) U.S. Cl.
CPC . *G01C 21/04* (2013.01); *G01S 5/16* (2013.01); *G01S 5/0252* (2013.01)

(58) Field of Classification Search
CPC ...... G01C 21/005; G01C 11/02; G01C 11/06; G01C 15/002; G01C 21/32; G01C 11/00; G01C 21/00; G01C 21/16; G01C 21/165; G01C 23/00; G01C 11/025; G01C 11/04; G01C 11/34; G01C 15/00; G01C 15/02
See application file for complete search history.

(56) References Cited

U.S. PATENT DOCUMENTS

| | | | | |
|---|---|---|---|---|
| 5,086,396 A * | 2/1992 | Waruszewski, Jr. | .... | F41G 7/343 701/300 |
| 5,974,423 A * | 10/1999 | Margolin | ................ | G06T 17/20 345/419 |
| 7,440,591 B1 * | 10/2008 | McCusker | ........... | G06K 9/0063 382/109 |
| 7,451,060 B2 * | 11/2008 | Minami | .................... | G01C 7/02 382/284 |
| 7,714,712 B2 * | 5/2010 | Emigh | ................ | B60R 25/1004 340/429 |
| 7,818,317 B1 * | 10/2010 | Emigh | .................... | H04W 4/02 455/456.1 |
| 8,095,249 B2 * | 1/2012 | Little | .................... | G01C 11/00 340/963 |
| 8,151,475 B2 * | 4/2012 | Albo | ........................ | F41G 3/02 33/318 |
| 8,275,544 B1 * | 9/2012 | Wells | .................... | G01C 21/165 342/146 |
| 8,798,812 B2 * | 8/2014 | Ryu | ........................ | G01S 13/94 701/120 |
| 8,837,782 B1 * | 9/2014 | Rosenwinkel | ......... | G01C 21/02 382/106 |
| 8,989,483 B2 * | 3/2015 | Cheng | ................ | G06K 9/00671 382/154 |
| 2001/0023390 A1 * | 9/2001 | Gia | ........................ | G01C 21/00 701/301 |
| 2001/0038718 A1 * | 11/2001 | Kumar | .................. | G06T 3/0081 382/284 |

(Continued)

*Primary Examiner* — Truc M Do

(74) *Attorney, Agent, or Firm* — Roach Brown McCarthy & Gruber, P.C; Kevin D. McCarthy

(57) ABSTRACT

The present invention relates to an auto locating system for finding the location of a viewpoint comprising: (a) at least one sensor for acquiring samples of the skyline view of said viewpoint; (b) at least one memory device, for storing Digital Terrain Map (DTM) related data; (c) at least one processor for processing said samples of said skyline view from said at least one sensor and for comparing the data derived from said samples with the data calculated from said DTM data for finding the location of said viewpoint; and (d) at least one output for outputting the location of said viewpoint.

20 Claims, 7 Drawing Sheets

(56) References Cited

U.S. PATENT DOCUMENTS

| | | | |
|---|---|---|---|
| 2006/0031004 A1* | 2/2006 | Lundberg | G01C 21/3461 701/533 |
| 2006/0149458 A1* | 7/2006 | Costello | G01C 21/005 701/438 |
| 2006/0184327 A1* | 8/2006 | Moscovitz | G01C 21/005 702/5 |
| 2007/0010965 A1* | 1/2007 | Malchi | G01C 3/06 702/151 |
| 2007/0046448 A1* | 3/2007 | Smitherman | G01C 11/02 340/431 |
| 2007/0088709 A1* | 4/2007 | Bailey | G06F 3/04815 |
| 2007/0104354 A1* | 5/2007 | Holcomb | G01C 11/02 382/109 |
| 2007/0160957 A1* | 7/2007 | Wen | A61C 7/00 433/213 |
| 2007/0237420 A1* | 10/2007 | Steedly | G06K 9/32 382/284 |
| 2008/0089577 A1* | 4/2008 | Wang | G06K 9/20 382/154 |
| 2009/0154793 A1* | 6/2009 | Shin | G06K 9/0063 382/154 |
| 2010/0283853 A1* | 11/2010 | Acree | G01C 11/00 348/144 |
| 2011/0181711 A1* | 7/2011 | Reid | G06T 19/003 348/121 |
| 2011/0231094 A1* | 9/2011 | Simon | G01S 5/16 701/469 |
| 2011/0282578 A1* | 11/2011 | Miksa | G06F 17/30241 701/532 |
| 2012/0038770 A1* | 2/2012 | Azulai | H04N 7/183 348/144 |
| 2012/0176494 A1* | 7/2012 | Kamon | G01C 11/06 348/135 |
| 2012/0232787 A1* | 9/2012 | Kunath | G01C 21/3461 701/423 |
| 2012/0257792 A1* | 10/2012 | Simon | G01C 11/06 382/103 |
| 2012/0290199 A1* | 11/2012 | Nadam | G01C 21/005 701/409 |

* cited by examiner

SELF-CONTAINED NAVIGATION SYSTEM AND METHOD

TECHNICAL FIELD

The present invention relates to navigation systems and methods. More particularly, the present invention relates to self-contained electronic navigation systems.

BACKGROUND

As of today, electronic navigation systems, such as GPS, rely on external radiating inputs, such as satellites. Unfortunately, these external radiating inputs are not always available, and therefore are not always reliable.

Other forms of navigation methods are also available today, such as inertial systems, e.g. "dead reckoning", which are a form of navigation that determines position of a vehicle by advancing a previous position to a new one on the basis of assumed moved distance and direction. A compass is used to indicate direction, and distance may be determined indirectly by measurement of speed and time, or measured directly as well. Nevertheless, the actual direction of travel and the actual distance may differ from the assumed direction and distance.

US 2012/0290199 discloses a method for self-orientation in a three dimensional environment by using a mapped data of the environment and a number of linear measurements. The mapped data of the environment has digitized data related to a number of points in the three dimensional environment. As disclosed in the publication, by performing a plurality of linear measurements to another feature of the environment it is possible to self-orient the location. The measurements comprise determining the distance between the object, and the relative azimuth between them, and the relative height between them.

It would therefore be desired to propose a system void of these deficiencies.

SUMMARY

It is an object of the present invention to provide a self-contained navigation method and system that does not rely on external radiating inputs or the knowledge of an initial known point.

It is another object of the present invention to provide a method and system for auto positioning that does not require more than one sensor.

It is still another object of the present invention to provide a new electronic navigation system which is size, cost and energy efficient.

Other objects and advantages of the invention will become apparent as the description proceeds.

The present invention relates to an auto locating system for finding the location of a viewpoint comprising: (a) at least one sensor for acquiring samples of the skyline view of said viewpoint; (b) at least one memory device, for storing Digital Terrain Map (DTM) related data; (c) at least one processor for processing said samples of said skyline view from said at least one sensor and for comparing the data derived from said samples with the data calculated from said DTM data for finding the location of said viewpoint; and (d) at least one output for outputting the location of said viewpoint.

In one embodiment the sensor is an inclinometer.

In one embodiment the sensor is an imaging sensor.

In one embodiment the imaging sensor is an infrared sensor.

In one embodiment the imaging sensor is a Terahertz sensor.

In one embodiment the system has image intensification capabilities.

In one embodiment the DTM is the DTM of a certain area.

In one embodiment the DTM is the DTM of the whole world.

Preferably, the system is also used for North finding.

Preferably, the system is also used for calculating the azimuth of the viewpoint.

Preferably, the system is implemented in a single device.

In one embodiment the system is used for zeroing an inertial navigation system.

In one embodiment the system is used for aiding a GPS system.

The present invention also relates to a method for auto locating a viewpoint comprising the steps of: (a) providing at least one maximal elevation data set of a DTM point; (b) providing at least one sensor capable of acquiring samples of the skyline view of said viewpoint; (c) receiving said samples related to said skyline view of said viewpoint acquired from said sensor; (d) deriving the maximal elevation data set from said data samples of said skyline view; (e) comparing said maximal elevation data set from said samples with said at least one maximal elevation data set of at least one of said DTM's points; (f) finding the location of said viewpoint based on said comparison; and (g) outputting data related to said location of said viewpoint.

In one embodiment the method is used for auto locating a viewpoint which is higher than ground level.

In one embodiment the maximal elevation data set, comprises maximal elevation angles related to the gravity.

In one embodiment the maximal elevation data set, comprises maximal elevation angles that are relative to other samples of the skyline view.

Preferably, the maximal elevation data set of a DTM point is found by: (a) calculating the visible areas of said point; (b) finding the farthest visible points of said visible areas of said point which constitute the skyline; (c) calculating the elevation angles, for at least some of said found furthest visible points; and (d) storing at least some of said elevation angles as a maximal elevation data set.

In one embodiment the comparison is done using correlation techniques.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

Figure 1:
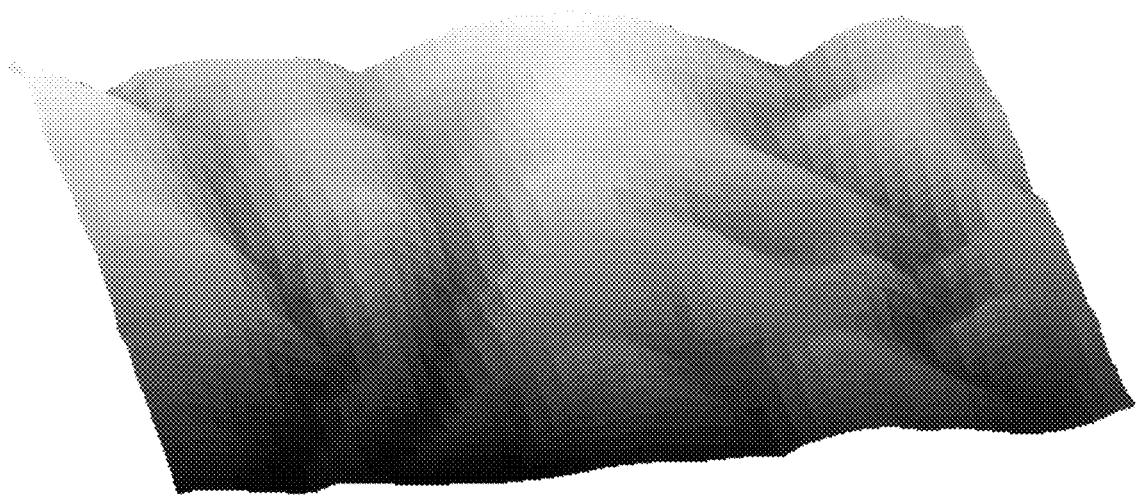
FIG. 1 is a visual 3D model interpretation of a Digital Terrain Map (DTM).

FIG. 1 is a visual 3D model interpretation of a Digital Terrain Map (DTM). The term "DTM", is intended to include any Digital Terrain Map, Data Terrain Map, Digital Elevation Map, Data Digital Surface Model or any other digital description of the shape of a land, such as a land cover or the city surface. A DTM may comprise a data map of terrain elevations, at regularly spaced intervals. In one embodiment a DTM having a resolution of 50 m is used. In other embodiments, DTMs having other resolutions may be used, such as a DTM having resolution of 1 km or 1 meter or 1 cm. From the data of the DTM it may be possible to calculate, for each point on the DTM, its specific visible area and hence its farthest visible points on the map, referred to hereinafter as the skyline of the point. The skyline of a point can be used to calculate a series of maximal elevation angles of the point. In one embodiment, a maximal elevation angle of a point is the angle that can be measured from the physical location of the point to one of the points of its physical skyline, i.e. the visible horizon, in respect to gravity or any other preset reference. For the sake of brevity, the physical location of a point is referred to hereinafter as the "viewpoint", and the physical skyline of the viewpoint is referred to hereinafter as the "skyline view". The series of the maximal elevation angles of a single point is referred to hereinafter as a "maximal elevation data set". In one embodiment, a series of the maximal elevation data set may comprise 3 or more maximal elevation angles. In one embodiment the series of the maximal elevation angles comprises 10 maximal elevation angles. In another embodiment the series of the maximal elevation angles comprises approximately 20 maximal elevation angles. Therefore, if in a certain location, a user measures the angles, from his viewpoint to his skyline view; his location may be calculated and found. In other words, by comparing between: the maximal elevation data set of a skyline view, measured by a user in a viewpoint, to the calculated maximal elevation data sets of the skyline of the points on the DTM it is possible to find the location of the viewpoint of the user. This is based on the fact that the skyline surrounding a certain point on the map typically differs from the skyline surrounding a different point on the map, and the maximal elevation data set measured in a viewpoint differs from the series of maximal elevation data set measured from a different viewpoint. Furthermore, by using the maximal elevation data sets calculated for the points on the DTM, it is possible to find not only the specific viewpoint location but also its direction, i.e. its azimuth, otherwise known as "north finding".

In one embodiment, a DTM of a certain area is used where the user can determine his specific location on map based on calculations made on the points of that DTM. In this embodiment the used DTM may be the DTM of the country or area of the user or selected in any other way. In some of the cases the user may be notified that he is not present at any point on the used DTM. In this case, if desired, another DTM may be added and used. In another embodiment a DTM of the whole world may be used.

Figure 2:
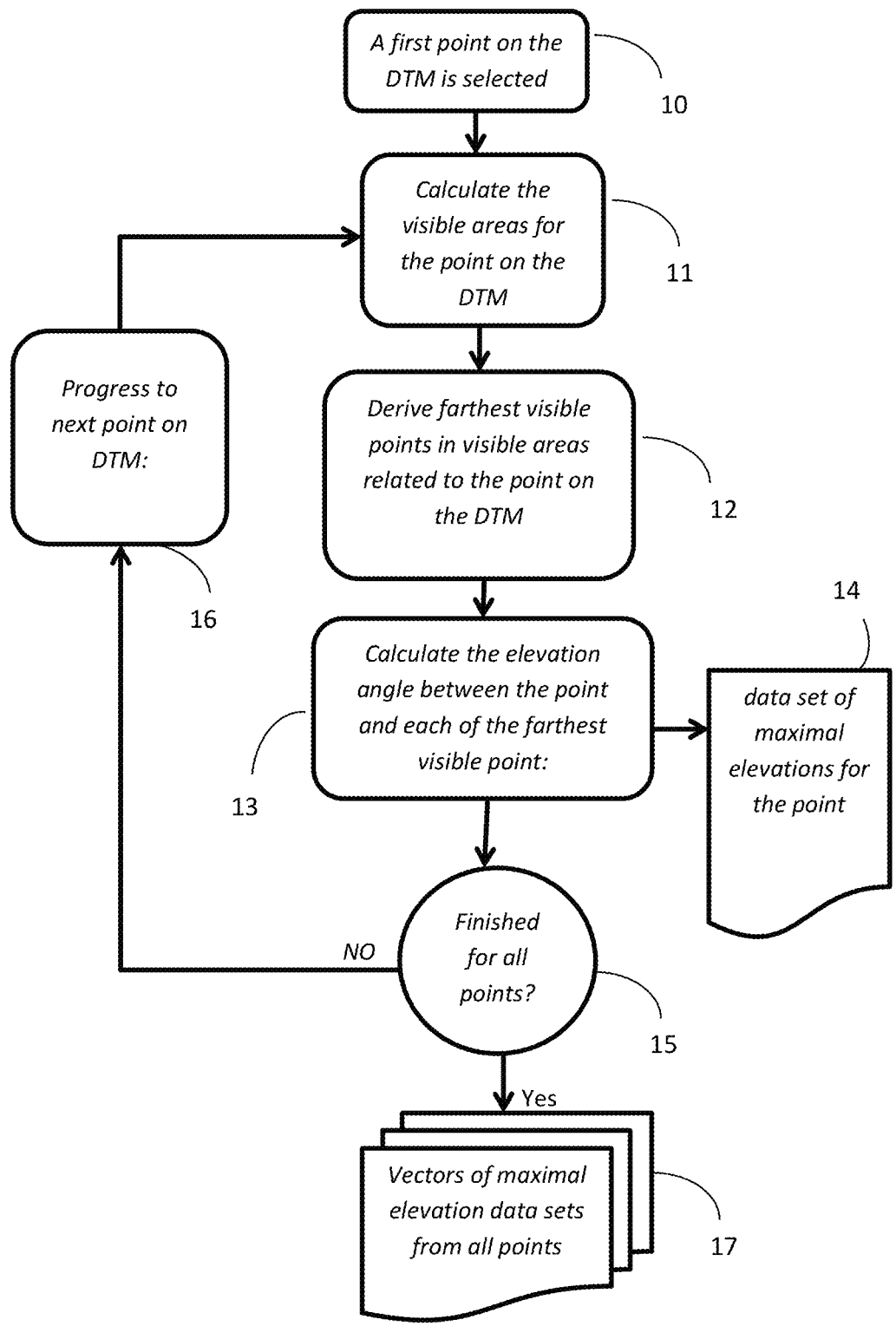
FIG. 2 is a schematic diagram of a process for calculating the maximal elevation data set for points on a DTM, according to an embodiment of the invention.

FIG. 2 is a schematic diagram of a process for calculating the maximal elevation data set for points on a DTM, according to an embodiment of the invention. In step 10 a first point from the DTM is selected. In step 11, the visible areas, of the selected point, are calculated and found. The visible areas are the points where an imaginary line from the selected point to these points on the DTM is unobstructed. The visible area of the selected point may be calculated using any processing techniques such as using the "VIEWSHED" function of MATLAB on the data of the DTM points. In step 12 the farthest visible points in the visible areas of the selected point are found which constitute the skyline of the selected point. A farthest visible point is found by selecting a certain imaginary line from the point and finding all the points which overlap or are relatively close to this imaginary line, then, selecting out of these close or adjoined points the furthest point from the selected point. The points selected as close, may be found using the function "ROUND" in MATLAB, or using any other known method. In one embodiment, the closeness of the points may be a function of the resolution of the DTM. In other words finding the furthest visible point of a direction may be done by checking the Euclidean distance between the visible points on the DTM in a certain direction to the selected point, and determining, for a certain direction, which specific visible point on the DTM has the maximal distance from the selected point. For example: If the Euclidian distance between two points, (x1,y1) and (x2,y2) on DTM is the distance$((x1,y1),(x2,y2))$=square root$\{(x1-y1)^2+(x2-y2)^2\}$, and for the max distance in a certain direction: Max{distance $(x1, y1),(x[i], y[i])\}$=Max [square root $\{(x1-y1)^2+(x[i]-y[i])^2\}$], i=1, 2, 3 . . . n, which are all points on DTM in a certain direction from (x1, y1). After finding the farthest visible point of a certain direction another imaginary line may be selected. This new imaginary line may have any offset angle such as 0.1 degrees from the first imaginary line. In one embodiment the offset angle may be selected according to the distance of the furthest visible points, since the span between the sequential farthest visible points depends upon the distance from the selected point and the span between sequential angles. Thus more imaginary lines may be selected in this manner where each has an offset angle from its predecessor imaginary line. In one embodiment the process continues until a full circumference of 360 degrees is achieved. For example if a fixed offset angle of 0.1 degrees is selected, then, 3600 imaginary lines may be selected and processed. Other embodiments may have different fixed offset angles or unfixed offset angles. In step 13, the elevation angles, for each of the furthest visible points, is calculated by calculating, for each of the farthest visible points, its differentiate height, in relation to the point, and its distance from the point. Each pair, the differentiate height and the distance, of a farthest visible point, constitute the tangent of the elevation angle of this farthest visible point. Thus the term "elevation angle" is meant to include the vertical degree, i.e. inclination, between a point and another point. In step 14, each of the elevation angles, found in step 13, for each of the furthest visible points is set and stored in relations to the selected point. If the maximal elevation angles data set has been calculated for all the desired points, then, in step 15, the process continues to step 17. However, if the maximal elevation angles data set has not been calculated for all the desired points on the DTM, then, in step 15, the process continues to step 16 where another point on the DTM is selected, and steps 11 to 15 are repeated. When the process reaches step 17, after calculating the maximal elevation angles for all the desired points of the DTM, they are stored as vectors or in any other way. In one embodiment the desired points are all the points of the DTM, where the process continues calculating the maximal elevation angles for all the points of the DTM. In another embodiment the desired points are some of the points of the DTM, such as: selecting only a fourth of the points, of the DTM, having regularly spaced intervals between them, or any other selection of points. In yet another embodiment, the process may calculate the maximal elevation angles for some of the points of the DTM as a first step and then, based on results or any other constraint, the process may continue only for the points within certain proximity.

Figure 3A:
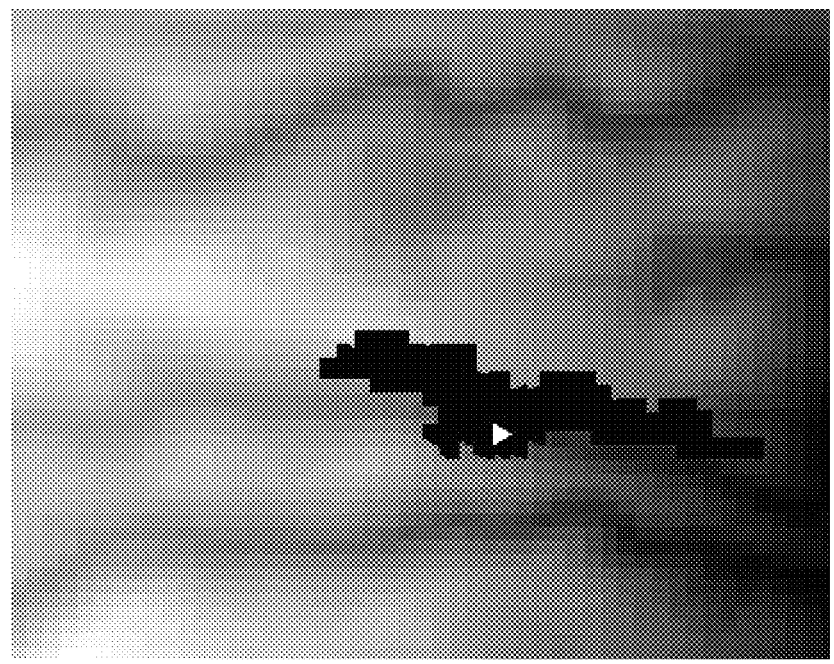
FIG. 3A depicts an example of a visual model interpretation of a top view of a DTM, according to an embodiment of the invention.

FIG. 3A depicts an example of a visual model interpretation of a top view of a DTM, according to an embodiment of the invention. In this example, the white triangle depicts the viewpoint, and the black squares depict the areas visible from the viewpoint on the DTM map.

Figure 3B:
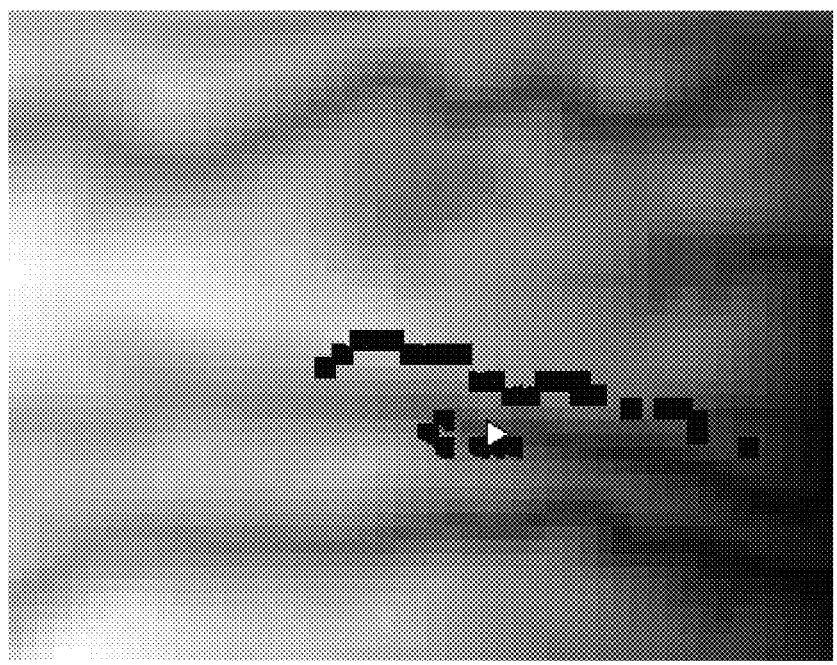
FIG. 3B depicts the maximal elevation points on the example model of FIG. 3A, according to an embodiment of the invention.

FIG. 3B depicts the maximal elevation points on the example model of FIG. 3A, according to an embodiment of viewpoint in clockwise direction, or for example: sample the skyline of all range peaks and/or ridge, or any other sampling technique. In one embodiment the samples are taken in relatively uniformly offset angles, such as every 18 degrees. In step 22, the maximal elevation data set is derived from the inclinometer's samples. In one embodiment the inclinometer outputs the elevation angles it is aimed at, when it is aimed at the skyline view, and these angles may be aggregated together to form the maximal elevation data set of the viewpoint. In step 23 the maximal elevation data set derived from the inclinometer is compared with the maximal elevation data set calculated for the DTM points, as described in relations to FIG. 2. In step 24 the location of the viewpoint may be found based on the comparisons from step 23. In addition the North may be found as well as a relation to the position, i.e. the azimuth, of the user. This may be done by comparing the last sample from the inclinometer, or by calculating the cyclic convolution order of the samples.

For the sake of brevity an example is set forth for carrying out an embodiment of the invention:

Set below are an example of the maximal elevation points, which together create a maximal elevation data set. As can be seen in the table below, the derived data is for example point (X=32, Y=21) on an example DTM map:

| Viewpoint is X = 32 y = 21 height = 370.17 | X | Y | Height in DTM at (x, y) point | Delta height between the point and skyline point | Projection Distance in meters (pixel = 50 m) | Calculated elevation angle from DTM |
|---|---|---|---|---|---|---|
| Point on skyline | 20 | 31 | 396.85 | 26.6800 | 70.7107 | 20.6721 |
| Point on skyline | 17 | 30 | 421.75 | 51.5800 | 223.6068 | 12.9894 |
| Point on skyline | 16 | 30 | 424.43 | 54.0600 | 269.2582 | 11.3526 |
| Point on skyline | 15 | 31 | 400.4 | 30.2300 | 304.1381 | 5.6763 |
| Point on skyline | 15 | 32 | 370.88 | 0.7100 | 300.0000 | 0.1356 |
| Point on skyline | 14 | 35 | 355.88 | −14.2900 | 380.7887 | −2.1492 |
| Point on skyline | 18 | 35 | 394.42 | 24.2500 | 212.1320 | 6.5215 |
| Point on skyline | 19 | 35 | 407.33 | 37.1600 | 180.2776 | 11.6471 |
| Point on skyline | 20 | 35 | 422.51 | 52.3400 | 158.1139 | 18.3159 |
| Point on skyline | 21 | 35 | 430.57 | 60.4000 | 150.0000 | 21.9330 | the invention. In this example, the white triangle is the viewpoint as well, however, the black squares are the farthest visible points derived from the visible areas of the viewpoint.

Figure 4:
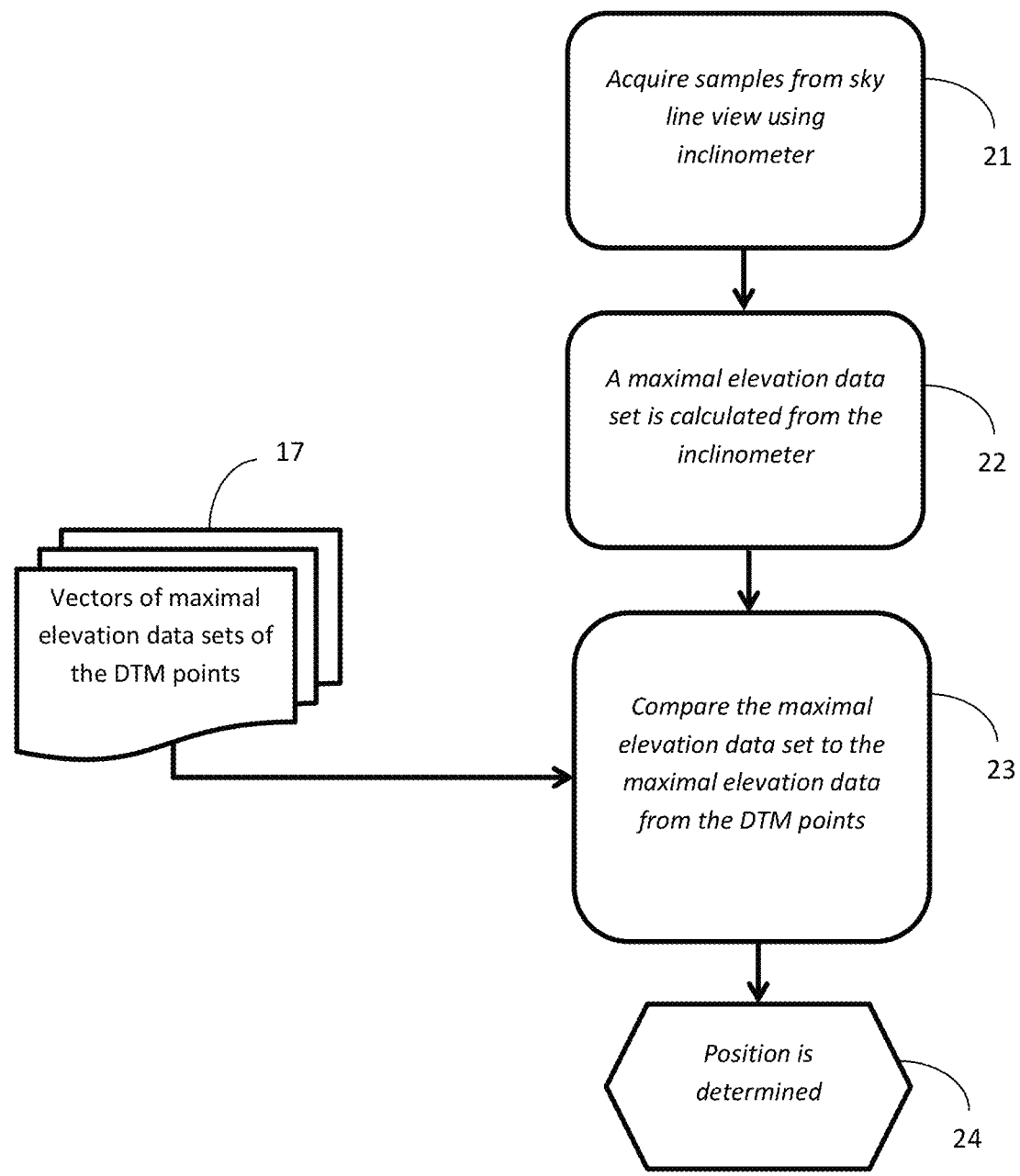
FIG. 4 is a schematic diagram of an auto locating process using an inclinometer sensor, according to an embodiment of the invention.

FIG. 4 is a schematic diagram of an auto locating process using an inclinometer sensor, according to an embodiment of the invention. The term "inclinometer" is meant to include any know instrument for measuring angles of elevation and depression such as a MEMS sensor, accelerometer, electrolytic, mercury, gas bubble liquid or pendulum. For example, a dual-axis digital inclinometer and accelerometer made by Analog Devices Model: ADIS16209 may be used. In this embodiment, the inclinometer may be used as an elevation sensor in order to find the elevation angles between the viewpoint and the points of its skyline view. For example, the user can gather the data needed by tracking the skyline view while sampling and saving the measurements from the inclinometer. In step 21, the user can acquire at least 1 sample, i.e. reading from the inclinometer, of the skyline view from his viewpoint. In one embodiment 10 different samples may be acquired, in other embodiments, 20 different samples or any other number of different samples may be acquired. In one embodiment, the sampling of the skyline is done consistently, for example: the user may sample the skyline view around the Thus, each point of the DTM has its own maximal elevation data set. After producing all the maximal elevation data sets for each of the desired points of the DTM, it can be compared to the maximal elevations data set calculated from the samples taken by the user:

Continuing the example above, the angles measured by the user using an inclinometer are:

20.67 12.98 11.35 5.67 0.13 −2.14 6.525 11.64 18.31 21.93

Now it is possible to compare the maximal elevation data sets from the points of the DTM to the maximal elevation data set the user has measured at his viewpoint. As shown above, the calculated elevation angles from the DTM at point (X=32, Y=21) on DTM matches the user measurement at the unknown location. Therefore, the user measured his maximal elevation data set from viewpoint located at (X=32, Y=21) on the map.

The comparison between the maximum elevation data set measured by the user and between the maximum elevation data sets calculated from the DTM data can be done in few methods; one of them is correlation between the maximum elevation data set measured by the user and the maximum elevation data sets that were produced for the points of the DTM.

|  | Correlation results with Original point of view (x = 32 y = 21) maximal elevation data set: |
| --- | --- |
| maximal elevation data set at (x = 32 y = 21) | 0.9812 |
| maximal elevation data set at (x = 32 y = 20) | 0.7289 |
| maximal elevation data set at (x = 31 y = 21) | 0.5464 |
| maximal elevation data set at (x = 32 y = 14) | 0.6734 |

In the table above we can see the correlation results for correlation between the maximal elevation data set measured by the user and the different elevation data sets calculated from the DTM. As shown in the table above, there is a good correlation score when comparing the maximal elevation data sets of a certain point on map to the user measured maximal elevation data set at the same certain point.

In one embodiment, the term auto locating may include the ability to determine the location of a viewpoint on map.

Figure 5:
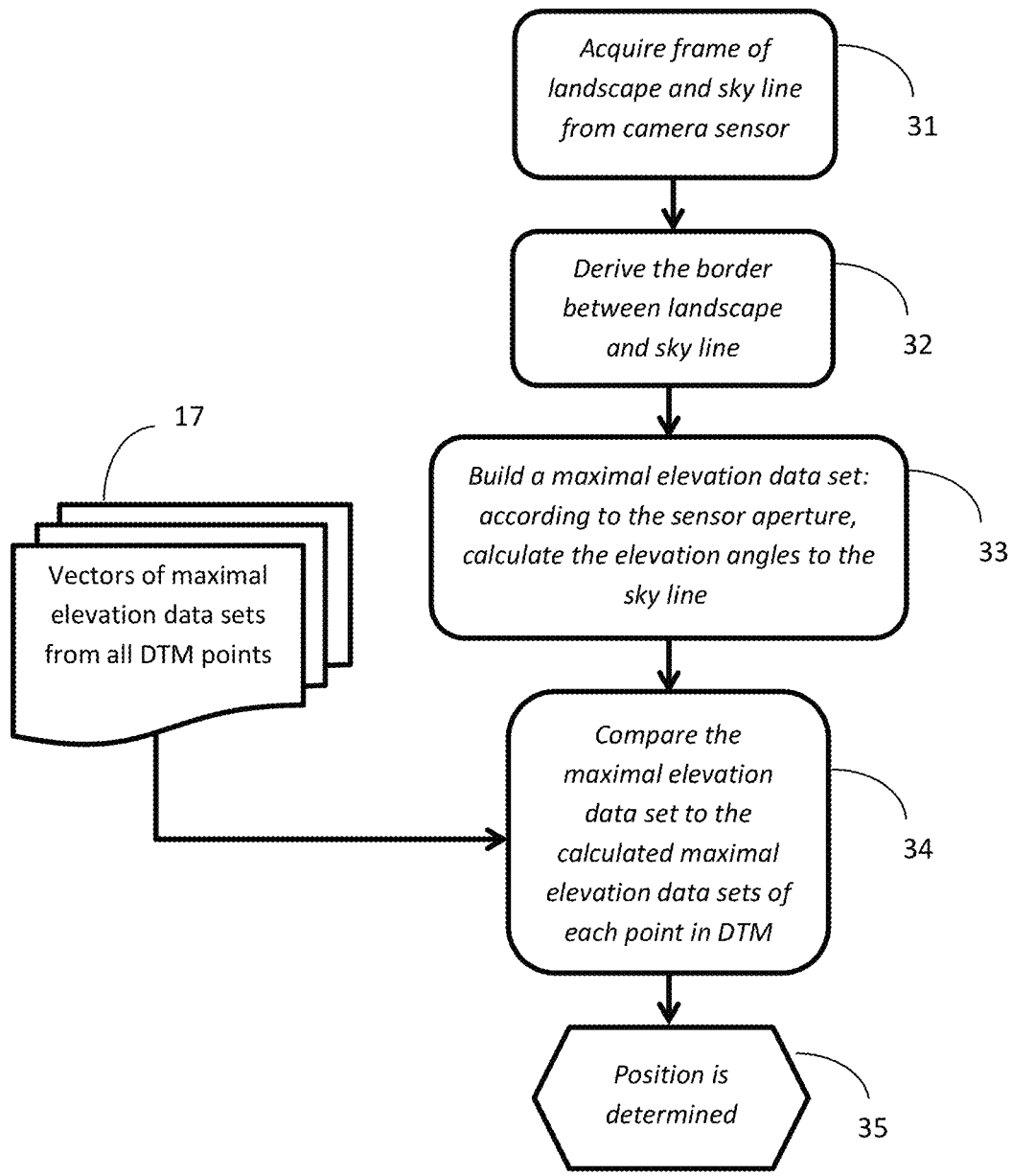
FIG. 5 is a schematic diagram of an auto locating process using an imaging sensor, according to an embodiment of the invention.

FIG. 5 is a schematic diagram of an auto locating process using an imaging sensor, according to an embodiment of the invention. For example, an imaging sensor may be a FLIR First Mate II MS-224b NTSC 240×180 Thermal Night Vision Camera. In this embodiment, an imaging sensor may be used in order to find the angles between the viewpoint and points of its skyline view, and thus may be used for auto positioning. For example, a user at a viewpoint can aim the imaging sensor to the skyline view and acquire images of the skyline view from different directions. In one embodiment 4 images may be taken for example: using 4 sensors where each one is aimed, for example, to a different sector having 90 degrees angles in between, or in another embodiment, using 1 sensor with a beam splitter for a total of 4 directions. In other embodiments, a single sensor may be used, for example: using a sensor and rotating it in an offset angle, where the degree of the rotation offset angle can be as the fixed aperture of the lens, or as the user rotates the imaging sensor to the end of the last captured sector, or by using an automatic method of image processing. In one embodiment the number of sectors depends on the lens aperture. In step 31, the user can acquire frames of the land and skyline border from his viewpoint using the imaging sensor. In step 32, the border between the landscape and the sky, i.e. the skyline, is derived, using image processing techniques such as edge detection—where a "mathematical filter" can detect where the image brightness changes sharply, this sharp change occurs between the sky and the land. In step 33 the maximal elevation data set can be built according to the sensor aperture, and the calculated elevation angles to the skyline. For example, if the degrees represented by each line on an image sensor=(total vertical aperture in degrees) divided by (number of lines in image sensor), and if, for example, the imaging sensor has 1000 lines from the top to the bottom of the acquired frame, there is a total of 1000 pixels that comprise the vertical aperture. Furthermore, if the aperture is 10 degrees, then, each pixel in the vertical axes represents 10/1000=0.01 degrees. After calculating the pixels to degree conversion, it is possible by means of image processing, for example: edge detection, to determine the absolute elevations in the acquired frame. If required the same technique may be applied for the horizontal, i.e. the azimuthal, aperture. In step 34 the maximal elevation data set built from the imaging sensor is compared with the maximal elevation data from the DTM points, as described in relations to step 17 of FIG. 2. In step 35 the location of the viewpoint may be found based on the comparisons from step 34. In addition the North may be found as well as a relation to the position, i.e. the azimuth, of the user. This may be done by comparing the last image from the imaging sensor, or by any other means.

In other embodiments different imaging sensors may be used such as infrared sensors and thermal sensors. Other imaging techniques may also be used, for example: Image intensification technologies which enhance the moonlight and starlight, Active illumination technologies which use additional source of light typically in the IR band, and thermal imaging which detect changes in temperature of objects. In one embodiment a FLIR First Mate II MS-224b NTSC 240×180 Thermal Night Vision Camera may be used for acquiring the images for the auto locating process. In another embodiment, the imaging sensor may be a Terahertz sensor.

Figure 6A:
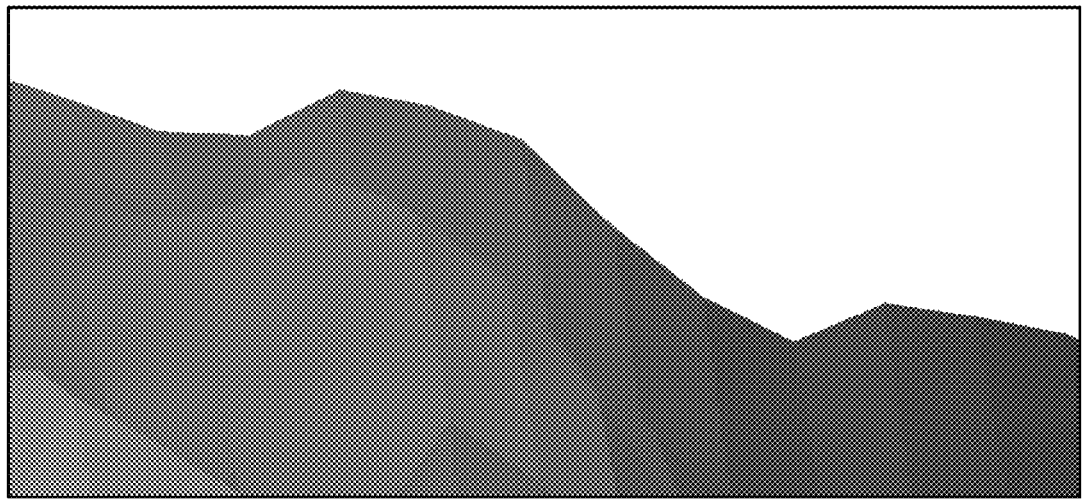
FIG. 6A depicts an example image of a part of a skyline from a camera view, according to an embodiment of the invention.

FIG. 6A depicts an example image of a part of a skyline from a camera view, according to an embodiment of the invention. In this embodiment, a user which is located at an unknown point on map which is within the borders of an available DTM can use a camera or any other imaging system to find his position. Since the imaging sensor has a known aperture, by capturing the skyline, surrounding the user, it is possible to derive the maximum elevation angles of the viewpoint. Thus in order to get the maximal elevation angles, from the sample pixels, it is possible to use known methods of image processing. For example, since the color of sky is significantly different from the color of land it is possible to derive the skyline pixels using a known image process called edge detection.

Figure 6B:
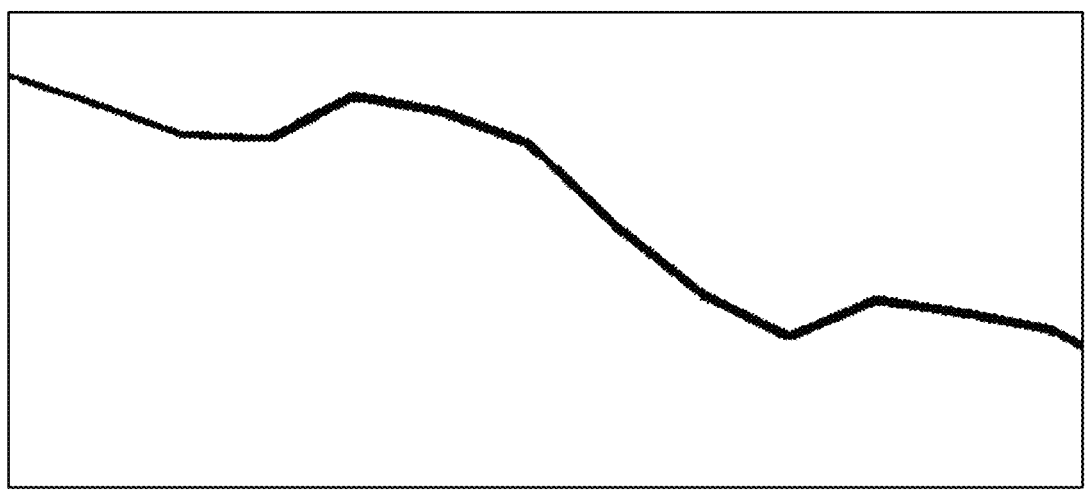
FIG. 6B depicts an example of a skyline derived from the example image of FIG. 6A, according to an embodiment of the invention.

FIG. 6B depicts an example of a skyline derived from the example image of FIG. 6A, according to an embodiment of the invention. Since the skyline, of the viewpoint, can be derived in this example, it is possible to derive the maximal elevation angles to the skyline as well. For example, if the camera's sensor is leveled, and opens in a 6 degree aperture, and if the specific point of the derived skyline is exactly in the middle of the captured frame, the elevation angle of this specific point is 0. In another example, when a specific point in the derived skyline is in row 120, counting from top of captured frame, out of 480 rows of the sampled frame, the elevation angle from viewpoint is 1.5 degrees, as each quarter of frame is 1.5 degrees. In this way the elevation angle of each pixel can be found and a maximal elevation data set can be built.

Figure 6C:
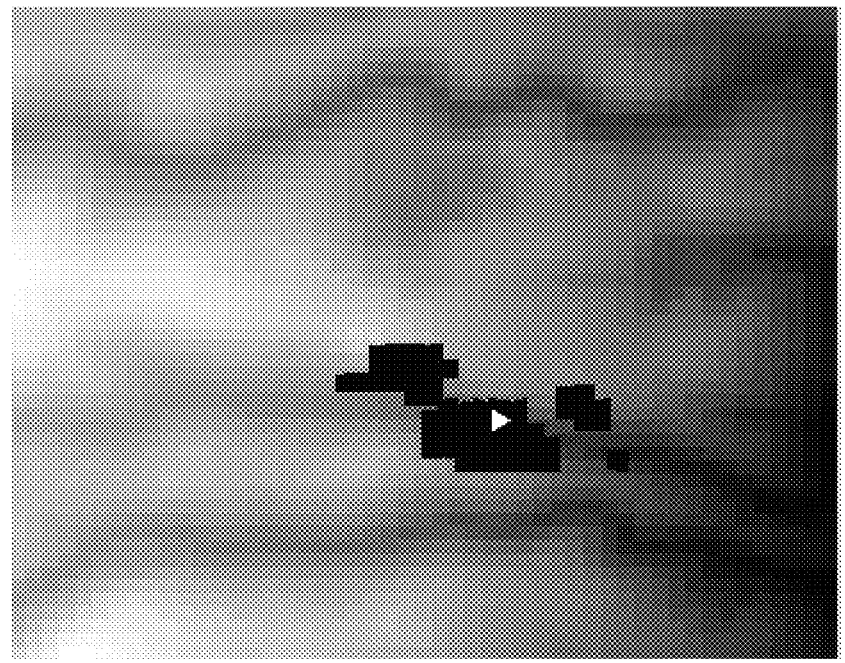
FIG. 6C depicts an example of a visual model interpretation of a top view of a DTM, according to an embodiment of the invention.

FIG. 6C depicts an example of a visual model interpretation of a top view of a DTM, according to an embodiment of the invention. In this example, the white triangle depicts the viewpoint, and the black squares depict the areas visible from the viewpoint on the DTM map.

Figure 6D:
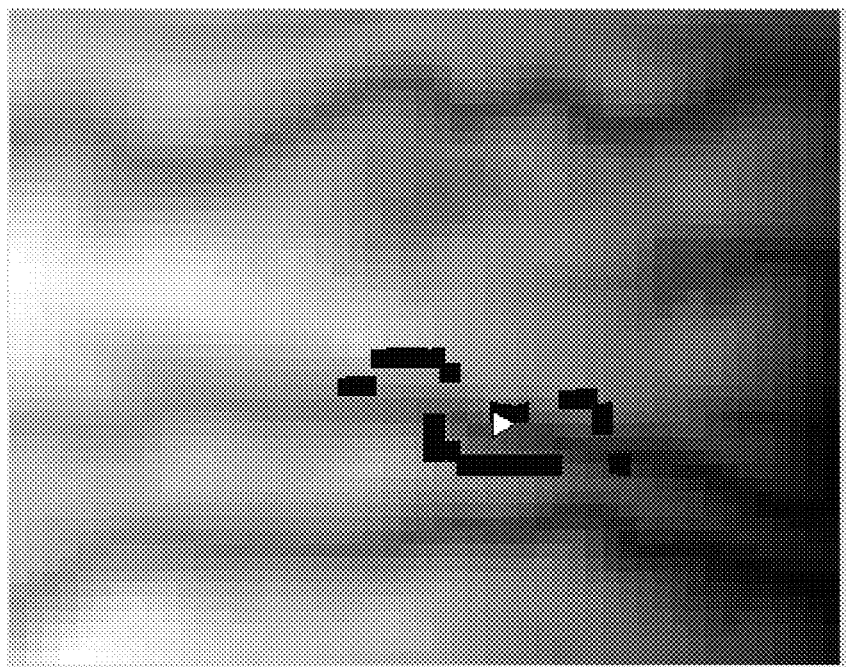
FIG. 6D depicts an example of the maximal elevation points on the visual model interpretation of FIG. 5C, according to an embodiment of the invention.

FIG. 6D depicts an example of the maximal elevation points on the visual model interpretation of FIG. 5C, according to an embodiment of the invention. In this example, the white triangle is the viewpoint as well, however, the black squares are the maximal distance points visible from the viewpoint.

Since the tangent of the "maximal elevation angle" equals to the delta between the height of a certain viewpoint to a point of its skyline view divided by the length of the projection to the viewpoint, the calculation can be done, for example, by moving in a pixel by pixel step from the specific viewpoint toward a certain direction and calculating by means of geometry for each step the delta height between the viewpoint to the defined skyline view, and on the other hand of the equation the known position of the pixel, which is the skyline derived from DTM for the specific pixel. Thus the maximal elevation data set is transformed to a data set of points positioned on the DTM and related to the viewpoint position. The beginning elevation specific vertical angular point may be unknown at first, however, it may be defined arbitrarily. Then, while sampling the skyline view, the delta between the elevations can be derived and the maximal elevation data set of the user viewpoint can be acquired. In this embodiment, the maximal elevation data set may comprise maximal elevation angles which are relative to other points of the skyline view, or to other samples, or to any other reference. Nevertheless, defining an arbitrary first elevation does not change the outline of the maximal elevation data set vector. Thus the user's derived maximal elevation data set can be compared to the DTM's maximal elevation data sets. The comparison may proceed for example using methods of image or shape correlation, such as the function "corr2" in MATLAB. Thus it is possible to find the most comparable shape between the maximal elevation data set of the user and the maximal elevation data sets vectors of the DTM. Another option, for example, is to compare the maximal elevation points' data sets of the DTM, each time, to a newly defined arbitrary angle. For example, each time ascending in one degree and comparing, where the best comparison achieved will be defined as the position of the user.

In one example, by comparing between: the maximal elevation data set of the skyline view measured by a user in an unknown location to the calculated maximal elevation data set of the skyline of each point on DTM, and finding the most similar angles, the location, in terms of an x, y point on the DTM, of the user can be found.

In one embodiment, the described method may be used for finding the location of a viewpoint that is higher than the surface of the land. For example, the described method may be used for navigating in a helicopter, or when the viewpoint is on bridge or on building, or any other location elevated from the surface. If the user is higher than the ground level in a certain viewpoint, and if his height from the ground level is known or can be fairly estimated, it is possible to calculate the position of the user using the described method by taking into account of the calculations the height of the user. However, in this case, the described calculations of the maximal elevation data set of the DTM slightly differ, as they are calculated in relations to the height of the user. This is mainly due to the skyline view which differs from the skyline of a user on ground level. Thus the building of the maximal elevation data set may be done by adding the height of the user and calculating for each desired point its maximal elevation data set from the raised user point. Then the user's maximal elevation data set can be compared to the new calculated maximal elevation data sets for the heightened points of DTM. The points on DTM, which the maximal elevation datasets are measured for, are the DTM points which the user height has been added to.

The auto locating system for finding the location of a viewpoint on a map may have at least one sensor for acquiring samples of the skyline view of the viewpoint. In one embodiment, the sensor may be an inclinometer such as Model: ADIS16209, dual-axis digital inclinometer and accelerometer made by Analog Devices. In another embodiment the sensor may be an imaging sensor such as the FLIR First Mate II MS-224b NTSC 240×180 Thermal Night Vision Camera. The system may also have at least one memory device such as a non-volatile memory SD Card Sandisk 16 GB and/or a volatile memory such as the SDRAM: 64 MBIT 133 MHZ produced by Micron technology Inc. The memory device may be used for storing the DTM data and/or storing the data samples from the sensor. The system may also have a processor such as the FPGA Cyclone, EP4CE115F23C8N by ALTERA. The processor may be used for processing the data samples from the sensor and comparing it with the data calculated from the DTM data for finding the location of a viewpoint on the DTM. The system may also have at least one digital output for outputting the location of said viewpoint such as an LCD module, 16*1 characters, LCM—s01601DTR produced by Lumex opto components Inc. The output may be used for outputting the found location of the user. In one embodiment the digital output is a screen which can display a map of the area to the user with his found location displayed on the map.

In one embodiment the calculation of the maximal elevation angles from the DTM may be done by the processor of the system which processes the readings from the sensor. In this embodiment the system may be capable to self-locate the user once the DTM map is loaded and once the user takes samples of his skyline view. In another embodiment instead of loading a DTM for calculating and extracting the maximal elevation data sets, a set of maximal elevation data sets is loaded into the system thus preserving the power of the system and eliminating the need to calculate maximal elevation data sets. Both of these last embodiments are especially helpful when desired to design a self-contained device for auto locating a user.

In one embodiment the calculations of the maximal elevation data sets and the processing of the sensor samples and the comparison between the two may be made by a remote server. In this embodiment the device used by the user can be designed for the purpose of acquiring samples of the skyline view. Once the samples of the skyline view are acquired they may be sent, via any known way of communication wired or wirelessly, to a remote server or processor. The remote processor may receive the sample of the skyline view and derive from them the maximal elevation data set. The maximal elevation data sets may then be compared to maximal elevation data sets already stored by the server for finding a comparison. Once a comparison is found, the found location may be sent back to the device for notifying the user. In one of the cases the device may derive the maximal elevation data set from the samples of the skyline view and send this maximal elevation data set to the remote server for comparison. Thus when the memory and/or processor are restricted, the user may send his measured maximal elevation dataset, partial or whole, to the remote server and all calculations can be done by the remote server, after which, the result of calculation, which is the user's position, can be sent to the user. Other configurations may be used as well for practicing the described method.

In one embodiment the method and system described above may be used for zeroing an inertial system. As known in the art, an inertial system may require zeroing as these forms of navigations determines position by advancing a previous position to a new one on the basis of assumed moved distance and direction. Since the actual distance and direction may differ from the assumed direction and distance these systems may require zeroing. Thus the described system and method may be used in combination with some of the inertial systems for zeroing these inertial systems and tuning them for better accuracy of navigation.

In another embodiment the method and system described above may be used for aiding the calculations of a GPS system. By using the described method for finding the initial location, this initial location may be used for aiding the GPS calculations.

In one embodiment the described method and system may be used for urban navigation, where the used DTM may be a Data Digital Surface Model of the city or area, and where the user may be located on the street, bridge, building, or any other urban structure.

While some embodiments of the invention have been described by way of example, the invention can be carried into practice with many modifications, variations, adaptations, and with the use of numerous equivalents or alternative solutions that are within the scope of persons skilled in the art, without departing from the invention or exceeding the scope of claims.

The invention claimed is:

1. An auto locating system for finding a location of a viewpoint in a certain area comprising:
   a) at least one sensor for acquiring samples of the skyline view of said viewpoint;
   b) at least one memory device, for storing Digital Terrain Map (DTM) related data;
   c) at least one processor, processor, connected to said memory device, for calculating for at least one point in the DTM, its skyline and for calculating a series of maximal elevation angles for at least one point of the DTM, and for calculating the point's maximal elevation data set for said point on the DTM, based on said series of maximal elevation angles, and wherein said processor is in communication with said sensor, for receiving and processing at least some of said samples, of said skyline view of said viewpoint, from said sensor, into the viewpoint's maximal elevation data set and for comparing said viewpoint's maximal elevation data set, derived from said samples, with said at least one point's maximal elevation data set, calculated from said DTM data, for finding the location of said viewpoint; and
   d) at least one output for outputting the location of said viewpoint.

2. The system of claim 1, where the sensor is an inclinometer.

3. The system of claim 1, where the sensor is an imaging sensor.

4. The system of claim 3, where the imaging sensor is an infrared sensor.

5. The system of claim 3, where the imaging sensor is a Terahertz sensor.

6. The system of claim 3, where the system has image intensification capabilities.

7. The system of claim 1, where the system is also used for North finding.

8. The system of claim 1, where the system is also used for calculating the azimuth of the viewpoint.

9. The system of claim 1, where the system is implemented in a single device.

10. The system of claim 1, where the system is used for zeroing an inertial navigation system.

11. The system of claim 1, where the system is used for aiding a Global Positioning System system.

12. A method for auto locating a viewpoint comprising the steps of:
   a) receiving a Digital Terrain Map (DTM) of said area;
   b) calculating for each point of the DTM, its skyline;
   c) calculating a series of maximal elevation angles for each of said points of the DTM;
   d) calculating maximal elevation data set for each point of the DTM, based on said series of maximal elevation angles for each of said point in the DTM;
   e) providing at least one sensor capable of acquiring samples of a skyline view of said viewpoint;
   f) receiving said samples related to said skyline view of said viewpoint acquired from said sensor;
   g) deriving the viewpoint's maximal elevation data set from said samples of said skyline view;
   h) comparing said viewpoint's maximal elevation data set with at least one of said maximal elevation data set of a point of said DTM;
   i) finding a location of said viewpoint based on said comparison; and
   j) outputting data related to said location of said viewpoint.

13. The method of claim 12, where the method is used for auto locating a viewpoint which is higher than ground level.

14. The method of claim 12, where the maximal elevation data set, comprises maximal elevation angles related to the gravity.

15. The method of claim 12, where the maximal elevation data set, comprises maximal elevation angles that are relative to other samples of the skyline view.

16. A method for finding the location of a viewpoint in a certain area comprising the steps of:
   a) providing a Digital Terrain Map (DTM) of said area;
   b) selecting at least one point of said DTM;
   c) calculating visible areas of said selected point of said DTM;
   d) finding the farthest visible points, of said visible areas of said selected point, by checking the Euclidean distance between said visible points on said DTM of at least one direction to said selected point, and determining, for said direction, which of said visible points, on said DTM, has the maximal Euclidean distance from the selected point;
   e) calculating, for said farthest visible points, their differentiate height, in relation to said point, and their distance from said point, for determining the elevation angles;
   f) storing at least some of said elevation angles as said point's maximal elevation data set;
   g) providing at least one sensor capable of acquiring samples of the skyline view of said viewpoint;
   h) receiving said samples related to said skyline view of said viewpoint acquired from said sensor;
   i) deriving the viewpoint's maximal elevation data set from said samples of said skyline view of said viewpoint;
   j) comparing said viewpoint's maximal elevation data set, from said samples, with said at least one point's maximal elevation data set of said at least one selected point of said DTM;
   k) finding the location of said viewpoint based on said comparison; and outputting data related to said location of said viewpoint.

17. The method of claim 16, where the comparison is done using correlation techniques.

18. The method of claim 16, where the method is used for auto locating a viewpoint which is higher than ground level.

19. The method of claim 16, where the maximal elevation data set, comprises maximal elevation angles related to gravity.

20. The method of claim 12, where the comparison is done using correlation techniques.

* * * * *